July 18, 1939.   O. J. KUHLKE   2,166,568

PROCESS OF MAKING AND COVERING ARTICLES

Filed June 15, 1938

INVENTOR
OTTO J. KUHLKE
BY Ely & Frye
ATTORNEYS

Patented July 18, 1939

2,166,568

UNITED STATES PATENT OFFICE 2,166,568

PROCESS OF MAKING AND COVERING ARTICLES

Otto J. Kuhlke, Akron, Ohio

Application June 15, 1938, Serial No. 213,828

5 Claims. (Cl. 107—54)

The present invention relates to a new and improved method of making and covering articles made from plastic materials, such, for example, as candies or the like, and while it is particularly designed and intended for the manufacture of lollipops, the same principles may be applied to the making and covering of other confections, particularly of the type known as "hard candies."

It is one of the purposes of the invention to improve upon the covering of such confections, and particularly lollipops, where a sanitary and moisture-proof covering is desired. It is the present universal practice to cover such confections after they have been formed or molded with waxed paper or similar, partially transparent material. The resultant product is unsightly and unsanitary and, in addition, cannot protect the surface of the confection from the action of the atmosphere which attacks and crystallizes the surface of the confection and renders it cloudy, sticky and unattractive.

My process eliminates the objectionable features of the old and generally practised methods, for an air-tight covering is provided which entirely prevents the admission of air to the surface of the confection. In addition, the covering which is employed is clear and transparent and the confection is plainly seen through the covering as a clear, crystal-like mass which is much more attractive than the usual confection of this type. The covering effectively seals all of the surface, but may be easily removed. It not only retains the flavor and physical condition of the candy, but it is more sanitary than previous wrappers.

One of the primary features of the invention is the formation of the confection directly within the covering material which is confined within a mold, the syrup being forced within the envelop while hot so that the envelop expands to the limits of the mold and the candy adheres thereto.

While other types of transparent covering materials may be used, it has been found that the well known rubber hydrohalide film made in substantial accordance with the Calvert Patent No. 1,989,632 of Jan. 29, 1935, and sold under the trade name "Pliofilm," is admirably suited for the purpose. This material is moisture-proof to a high degree and will stick tightly to the surface of the confection, but can be stripped therefrom. It possesses the added advantage that the heat of the syrup will soften it sufficiently so that it will stretch and permit the formation of the body of the confection. The edges of the "Pliofilm," which are squeezed together between the mold surfaces, will not seal, so that it is advisable to weld the edges together under heat and pressure so that a permanent, air and moisture-proof covering film will be assured. The material is also tasteless and inert and will not affect the article molded therein.

The confections made in this manner will present a much more attractive appearance than the ordinary lollipop or other confection, and the invention gives other added advantages as will be apparent from the description of the invention.

The wrapped confection or other article is the subject of my copending application Serial No. 271,744, filed May 4, 1939.

It is also possible to extend the principles of the invention to the wrapping of other articles than confections, such, for example, as soaps, cosmetics, waxes, and the like. The material to be wrapped should be plastic so that it can be forced into the wrapper and heat should be applied to soften the wrapping material. Such changes in the process as may be required to adapt it to the more extended uses will be readily suggested to those skilled in the art.

In the drawing the best known or preferred form of practising the invention is shown, but it will be understood that the drawing is illustrative of one embodiment only. The commercial production of these articles will require automatic machinery and improvements in specific details of the apparatus or process which, however, will not depart from the basic principles of the invention as set forth herein. In the description the term "Pliofilm" will be used, but it will be understood that the invention is not limited to the use of this material. It is preferable that the material be transparent and moisture-proof, that it have the ability to adhere to itself under heat and pressure, and that it be tasteless, odorless and not affect the flavor of the confection or other material. It should also be stretchable or plastic to a sufficient degree to expand under the pressure of the material to be formed as it is forced into the cover. All of these requirements are fulfilled by "Pliofilm," but it is possible that other materials may be found that will supply all or some of the requirements and may be substituted therefor.

In the drawing I have illustrated a simple form of apparatus for practising the invention as applied to the manufacture of lollipops, but "kisses," "drops," or other hard candies may be made by similar methods.

Figure 1:
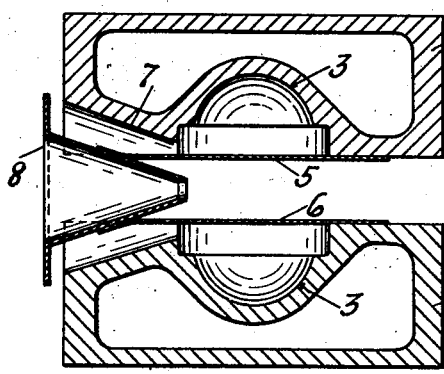
Fig. 1 is a side view of an individual mold showing it in open position with two plies of the covering material in place therein.
Figure 2:
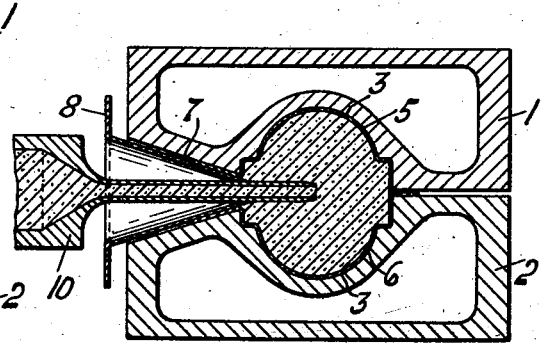
Fig. 2 is a view showing the mold closed with the needle or gun inserted therein and a full charge of the warm syrup in place.

In practising the invention by the preferred method, use is made of two complementary mold elements 1 and 2, each having a cavity 3 therein to form one side or half of the finished confection. As shown here, the cavity is designed to form a spherical body of the characteristic form of a lollipop, but this form is not essential as the mold may be made in any shape. The molds may be jacketed, as shown, for the circulation of a cooling fluid to maintain the surfaces of the mold at the right temperature to congeal the candy and prevent the disintegration of the covering through excess heat imparted by the molten syrup. Sufficient heat should be allowed to soften the material so that it will stretch easily under the pressure from the syrup.

Over the surfaces of the mold are laid two sheets 5 and 6 of the covering material. These may be held in position temporarily by any suitable means, a light suction exerted on the faces of the mold through apertures, not shown, or the molds may be vertically disposed if desired. At one side of the mold is formed the conical inlet passage 7 which is intended to receive a shield or guide 8 which not only serves to direct the gun or needle 10, through which the molten candy fluid is passed, between the layers of the wrapper, but also serves to protect the covering material from contact with the hot needle, which would tend to soften it unduly and might destroy the wrapper.

The mold is closed around the shield and the needle is inserted, whereupon the warm syrup is forced, under pressure, into the cavity. The warm fluid softens the sheet so that it stretches out into the mold cavity. The pressure upon the syrup is then relieved and the gun withdrawn, leaving a hole partially extending into the body of the candy to receive the stick. If a solid candy is desired, the syrup may be injected while the needle is being withdrawn to fill up this hole.

Figure 3:
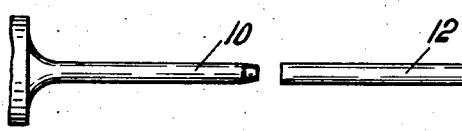
Fig. 3 is a view showing the gun withdrawn and the stick inserted.

While the candy is still plastic, the stick 12 is passed into the opening and forced into the candy sufficiently to embed it securely in position as shown in Fig. 3.

Figure 4:
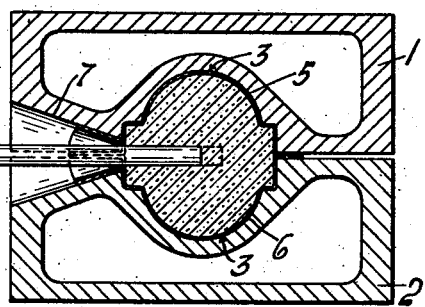
Figs. 4 and 5 are side and face views of the partially completed lollipop.
Figure 5:
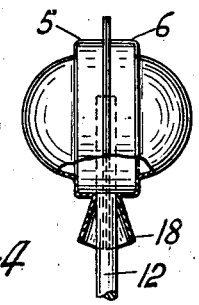
Figure 6:
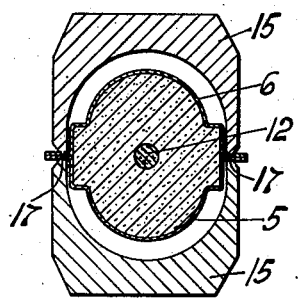
Fig. 6 is a view showing the welding operation on the line 6—6 of Fig. 5.

The partially finished lollipop is shown in Figs. 4 and 5 which show the appearance of the confection with square pieces of covering material.

Instead of using two separate pieces of the covering material, a single layer folded upon itself about one edge of the lollipop will make a satisfactory wrapper.

Figure 7:
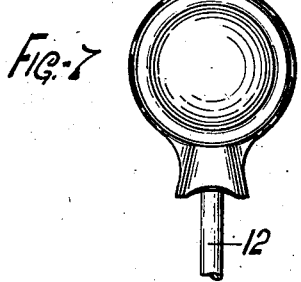
Fig. 7 is a view of the finished wrapped lollipop.

When the mold is opened, the confection will be hardened and will adhere to the surfaces of the wrapper. The wrapper may be stripped from the surface of the confection by pulling the loose skirt which remains unattached around the stick. The lollipop is now ready for the final sealing operation which welds the covering material together under heat and pressure so that it fuses into a permanent, air-tight, sealed joint. This may be done by blunt-edged, heated dies 15 which are heated to a sufficiently high temperature to fuse the material where the dies meet around the body of the candy and to pinch the "Pliofilm" so that it fuses or welds together in the welded joint 17. The outline of the dies is shown by the dotted lines 16 in Fig. 5, it being observed that the line of weld flares outwardly at the stick to leave the unattached skirts 18 which affords means for stripping the covering. The sealing operation not only welds the material, but also pinches it off and trims the lollipop to the finished form shown in Fig. 7.

Other changes and modifications may be made in the method and the invention may be refined or improved without departure from the essential features thereof as set forth in the claims.

What is claimed is:

1. The process of making and at the same time covering an article with a removable wrapper comprising holding together under pressure the edges of plies of a heat softenable wrapper, injecting a warm plastic between the plies with sufficient pressure so that the material of the plies is softened and expanded against the interior of a surrounding mold and sealing the edges of the plies about the body of the injected plastic.

2. The process of making and at the same time covering an article with a removable wrapper comprising holding together plies of a stretchable wrapping material, warming the wrapping material sufficiently so that it is stretchable, and while the plies are so held injecting the article while in plastic form between the plies with sufficient pressure to expand the wrapping material and to form the article while in contact with the wrapping material.

3. The process of manufacturing and covering a confection with a removable wrapper, comprising holding together the edges of plies of a stretchable covering material, injecting warm syrup under pressure between the plies of the covering material which will soften from the heat of the syrup, expanding the central portion of the covering material to a predetermined extent to form the completed covered confection, and sealing the covering material about the completed confection.

4. The process of simultaneously making and covering a lollipop with a removable covering comprising holding the edges of plies of a heat softenable and expansible material to form an envelope, injecting warm syrup within the central portion of the envelope and between the plies with sufficient pressure to expand the material and form a completed lollipop body, and inserting a stick into the body of the lollipop.

5. The process of simultaneously making and covering an article with a removable stretchable wrapper comprising holding plies of the wrapper consisting of a heat softenable material together by pressure exerted through two mold sections while the central portion of the plies are free to expand against confining walls of the mold, warming the wrapping sufficiently so that it is stretchable, and forcing the material to form the article while in plastic condition within the area surrounded by the mold between the plies of the wrapper while the wrapper is warm and sealing the plies of the wrapper together about the completed article.

OTTO J. KUHLKE.